(12) United States Patent
Shimada

(10) Patent No.: US 6,192,385 B1
(45) Date of Patent: Feb. 20, 2001

(54) PSEUDORANDOM NUMBER GENERATING METHOD AND PSEUDORANDOM NUMBER GENERATOR

(75) Inventor: Michio Shimada, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/226,102

(22) Filed: Sep. 21, 1998

(30) Foreign Application Priority Data

Sep. 24, 1997 (JP) .................................................. 9-276517

(51) Int. Cl.[7] .................................................. G06F 1/02
(52) U.S. Cl. .................................................. 708/250; 708/253
(58) Field of Search .................................. 708/250, 252, 708/253, 256; 380/46

(56) References Cited

U.S. PATENT DOCUMENTS

| | | | |
|---|---|---|---|
| 5,257,282 | * 10/1993 | Adkisson et al. | 708/256 |
| 5,323,338 | * 6/1994 | Hawthorne | 708/256 |
| 5,446,683 | * 8/1995 | Mullen et al. | 708/256 |

OTHER PUBLICATIONS

Schneier, "Applied Cryptography: Protocals, Algorithms and Source Code in C", 2d Ed., John Wiley & Sons, 1996, pp. 381–389.

Gollmann et al., Clock–Controlled Shift Registers: A Review, vol. 7, No. 4, (1989), pp. 525–533.

Kato, "Fundamental Cryptography", Science Ltd., 1989, pp. 168–187.

* cited by examiner

*Primary Examiner*—Tan V. Mai
(74) *Attorney, Agent, or Firm*—Foley & Lardner

(57) ABSTRACT

A register 205 of each pseudorandom number generating circuit 101 takes in and holds a state data composed of a plurality of bits in synchronism with a clock pulse of a clock signal. Function generator circuits 2021 and 2022 output data each composed of a plurality of bits correspondingly to the state data held in the register 205. A selector 203 selects a specific bit of either one of the two data output from the function generator circuits on the basis of a pseudorandom number $X_{i-1}$ generated by a preceding one of the pseudorandom number generating circuits and outputs it as a pseudorandom number $X_i$. On the other hand, another selector 206 selects one of the data output from the function generator circuits, except the specific bit thereof, according to the pseudorandom number $X_{i-1}$ generated by the preceding pseudorandom number generating circuit and supplies the selected data to the register 205 as the state data. Thus, it is possible to easily generate cryptographically highly safe pseudorandom numbers.

14 Claims, 10 Drawing Sheets

PSEUDORANDOM NUMBER GENERATING METHOD AND PSEUDORANDOM NUMBER GENERATOR

BACKGROUND OF THE INVENTION

The present invention claims priorities from Japanese Patent Applications No. 9-276517 filed Sep. 24, 1997 which is incorporated herein by reference.

1. Field of the Invention

The present invention relates to a pseudorandom number generating method and a pseudorandom number generator.

2. Description of the Related Art

A technique for operating a clock signal supplied to one pseudorandom number generator circuit dependently upon a pseudorandom number generated by another pseudorandom number generator circuit has been generally used since the mechanical cryptography in the World War II. Further, it is described in a book "Fundamental Cryptography" of Masataka Kato who was a specialist in the cryptographic field of the Imperial Army of Japan, which was published in 1989 by Science Ltd., that high quality pseudorandom number can be generated by thinning an output of an M series generator. However, there has been a problem that it is difficult to theoretically analyze a pseudorandom number generator which operates a clock signal, except a pseudorandom number generator (FIG. 1) constructed with "a plurality of cascade-connected linear feedback shift registers (LFSR's), particularly, LFSR's called M series generators", which will be described later.

However, such conventional pseudorandom number generator has the lock-in problem and, in order to prevent a cryptanalysts utilizing the lock-in phenomenon, a large number of LFSR's must be cascade-connected.

The lock-in problem means that, when a clock control signal generated on the basis of pseudorandom numbers generated by an initial stage LFSR is used, there may be a case where no clock is supplied to a next stage LFSR in a period of a plurality of successive clocks and, therefore, operations of the remaining LFSR's are stopped, resulting in that the pseudorandom number output from the pseudorandom number generator during that period is fixed to the same value.

This problem and other matters related thereto are described in detail in, for example, Dieter Gollmann and William G. Chambers, "Clock-Controlled Shift Registers, A Review", IEEE Journal on Selected Areas in Communications, Vol. 7, No. 4, pp. 525–533, May 1989 and Bruce Schneier, "Applied Cryptography: Protocols, Algorithms and Source Code in C", 2nd Edition, John Wiley & Sons, 1996.

FIG. 1 is a functional block diagram showing a basic construction of the conventional pseudorandom number generator having, as pseudorandom number generating circuits thereof, a plurality of cascade-connected orderly linear feedback shift registers (LFSR's). As shown in FIG. 1, the pseudorandom number generator includes a plurality (n) of m-bit LFSR's, where n and m are positive integers, respectively. When a value of a control signal L supplied to the respective LFSR's 902 through an input terminal 104 is logical "0" and a clock signal CLK is supplied from an i-th logical sum (OR) circuit 901 to an i-th LFSR 902, the i-th LFSR 902 holds a train of m bits of a train of (n×m) bits supplied to the i-th LFSR 902 through an input terminal 105, where i is a positive integer up to n. On the other hand, when the control signal supplied to the input terminal 104 is logical "1", the i-th LFSR 902 shifts the m-bit content thereof and outputs a pseudorandom number Xi (1 bit), every clock pulse of the clock signal which is an output of the i-th OR circuit 901.

An i-th Exclusive OR circuit 802 receives the pseudorandom number $X_i$ from the i-th LFSR 902 and a pseudorandom number $Y_{i-1}$ from a (i−1)th Exclusive OR circuit 802 and outputs a pseudorandom number $Y_i$ to a (i+1)th LFSR 902 as a clock control signal and to an (i+1)th Exclusive OR circuit 802. The last Exclusive OR circuit 802 outputs a pseudorandom number $Y_n$ to an output terminal 106 as an output of this pseudorandom number generator.

The i-th OR circuit 901 receives the clock signal CLK from the input terminal 103 and the clock control signal $Y_{i-1}$ and outputs a logical sum thereof Therefore, when the logical value of the clock control signal $Y_{i-1}$ is "0", the i-th OR circuit 901 outputs the clock signal supplied from the input terminal 103 as it is. On the contrary, when the logical value of the clock control signal $Y_{i-1}$ is "1", the clock signal supplied from the input terminal 103 is blocked by this OR circuit 901.

Therefore, when the clock signal is supplied from the input terminal 103 while the logical value of the clock control signal $Y_{i-1}$ is "0", the content of the i-th LFSR 902 is updated. However, when the logical value of the clock control signal $Y_{i-1}$ is "1", the content of the i-th LFSR 902 is not updated even if the clock signal is supplied from the input terminal 103.

Incidentally, the clock control signal $Y_0$ is a predetermined constant and it may be, for example, $Y_0=0$.

Now, a conventional pseudorandom number generator circuit used to constitute the pseudorandom number generator shown in FIG. 1 will be described in detail.

FIG. 2 is a functional block diagram showing an example of a basic construction of the conventional pseudorandom number generating circuit. In FIG. 2, a register 205 is responsive to a clock signal CLK from an input terminal 315 to hold a data of m bits output from a selector 204 as a data representing the state of its content and simultaneously supply the data thus held to a function generator circuit 202. The function generator circuit 202 converts the m-bit data supplied from the register 205 in a manner predetermined for the m-bit data to generate a data of (m+1) bits by adding 1 bit to the m-bit data. Further, the function generator circuit 202 supplies m bits of the (m+1)-bit data to the selector 204 and outputs the remaining 1 bit from an output terminal 317 as pseudorandom numbers.

The selector 204 selects and outputs the m-bit data supplied from an input terminal 313 when a logical value of the control signal L supplied from an input terminal 314 is "0" and selects and outputs the m-bit data supplied from the function generator circuit 202 when the control signal L is logical "1".

In a usual operating state of this pseudorandom number generating circuit, the function generator circuit 202 converts, in the above described manner, the data supplied from the register 205 and representing a current state of the content of the register 205 and outputs the converted data to the selector 204. The register 205 takes in and holds the converted data supplied from the selector 204 every time when the clock pulse of the clock signal CLK is input. Therefore, the internal state of the register 205 is changed every clock pulse and the function generator circuit 202 generates pseudorandom numbers dependently on the changed internal state of the register 205 and outputs the pseudorandom numbers through the terminal 317.

FIG. 3 is a functional block diagram showing a basic construction of the conventional pseudorandom number generating circuit which is specifically called "non-linear feedback shift register". In FIG. 3, components which are the same as those shown in FIG. 2 are depicted by the same reference numerals, respectively, without detailed description thereof.

The pseudorandom number generating circuit shown in FIG. 3 differs from the pseudorandom number generating circuit shown in FIG. 2 in construction of the function generator circuit 202. That is, the function generator circuit 202 of the pseudorandom number generating circuit shown in FIG. 3 is constituted with a function generator circuit 401 and a shifter 402.

The function generator circuit 401 functions to output a 1-bit data for an input m-bit data and the output data of the function generator circuit 401 is supplied to the shifter 402 and is output through the output terminal 317 as pseudorandom number.

The shifter 402 derives left side (m−1) bits of the m-bit data supplied from the register 205 by shifting the m-bit data rightward by 1 bit, adds a 1-bit output data from the function generator circuit 401 to the leftmost end of the (m−1) bits and supplies a resultant m-bit data to the register 205 through the selector 204.

Therefore, the function generator circuit 202 of this pseudorandom number generating circuit shown in FIG. 3 converts a data indicative of a current internal state of the register 205 through the operations of the function generator circuit 401 and the shifter 402 and outputs the converted data to the register 205 and the register 205 takes in and holds the data output from the function generator circuit 202 through the selector 204 every time each of the clock pulses of the clock signal CLK is input in the usual operating state thereof. Therefore, the function generator circuit 202 generates pseudorandom numbers on the basis of the internal state of the register 205 which is changed every time a clock pulse is input and outputs the pseudorandom numbers through the terminal 317.

FIG. 4 is a functional block showing a basic construction of the linear feedback shift register constituting the pseudorandom number generator shown in FIG. 1. In FIG. 4, components which are the same as those shown in FIGS. 2 and 3 are depicted by the same reference numerals without detailed description thereof.

The LFSR 902 shown in FIG. 4 differs from the pseudorandom number generating circuit shown in FIG. 2 or 3 in that a function generator circuit 401 thereof is constituted with an Exclusive OR circuit 501. The Exclusive OR circuit 501 outputs an exclusive logical sum of a predetermined number of bits of the m-bit data from the register 205 to the output terminal 317 and to the shifter 402.

Therefore, the function generator circuit 202 of this pseudorandom number generating circuit also converts a data indicative of a current internal state of the register 205 by the operations of the function generator circuit 401 and the shifter 402 and outputs the converted data to the selector 204 and the register 205 takes in and holds the data output from the selector 204 every time when a clock pulse of the clock signal CLK is input in the usual operating state thereof, and, therefore, the function generator circuit 202 generates pseudorandom numbers on the basis of the internal state of the register 205 which is changed every time a clock pulse is input and outputs the pseudorandom numbers from the terminal 317.

When a period of pseudorandom numbers generated in such LFSR 902 is $2^m-1$, the latter LFSR is specifically called as an M series generator.

However, in the conventional pseudorandom number generator shown in FIG. 1, when the clock signal is supplied from the input terminal 103, the clock signal is blocked by the OR circuit 901 and the content of the i-th LFSR 902 is not updated if the logical value of the clock control signal $Y_{i-1}$ is "1". As a result, the previously mentioned lock-in problem occurs. In order to prevent the cryptanalysts based on the lock-in phenomenon, a large number of LFSR's 902 must be cascade-connected and, therefore, the size and cost of the conventional pseudorandom number generator become considerable. When such pseudorandom number generator is designed by taking the size and cost into consideration, the performance thereof may be restricted necessarily.

SUMMARY OF THE INVENTION

An object of the present invention is to provide a method for generating cryptographically highly safe pseudorandom numbers which is free from the lock-in problem.

Another object of the present invention is to provide a device for use in realizing the method, which is compact and low cost.

According to the present invention, in order to achieve the above objects, a method for generating cryptographically highly safe pseudorandom numbers, in which a plurality of orderly pseudorandom number generating circuits are used, each pseudorandom number generating circuit generates a first pseudorandom number on the basis of a first pseudorandom number generated by a preceding pseudorandom number generating circuit and a second pseudorandom number is generated on the basis of the first pseudorandom numbers generated by the respective pseudorandom number generating circuits, is featured by comprising the steps of holding a state data composed of a plurality of bits in each of the pseudorandom number generating circuits, producing a first and second data each composed of a plurality of bits corresponding to the state data thus held in the pseudorandom number generating circuit, selecting a specific bit of either the first or second data according to the first pseudorandom number generated by the preceding pseudorandom number generating circuit and outputting the specific bit as the first pseudorandom number of the pseudorandom number generating circuit and selecting the data of either the first or second data except the specific bit according to the first pseudorandom number generated by the preceding pseudorandom number as a state data to be held next.

The method for generating cryptographically highly safe pseudorandom numbers according to the present invention is further featured by comprising the step of generating a plurality of orderly data each composed of a plurality of bits corresponding to the held state data such that the first data of the plurality of orderly data is generated directly from the state data, the second and subsequent data are generated from the respective immediately preceding data, the first data is a data of the plurality of orderly data except the last data thereof, and the second data is the last data of the plurality of orderly data.

The method for generating cryptographically highly safe pseudorandom numbers according to the present invention is further featured by that the first data is an $S_0$-th data of the plurality of orderly data and the second data is an $S_1$-th data, where $S_0$ and $S_1$ are integers satisfying the inequality $0 < S_0 < S_1$, that a period $L_i$ of a series of the first pseudorandom number generated by the i-th pseudorandom number generating circuit and $(L_{i-1} - W_{i-1}) \times S_0 + W_{i-1} \times S_1$ are relatively prime for an arbitrary i and $L_i$ and $L_1 \times L_2 \times \ldots \times L_{i-2}$ are relatively prime for an arbitrary i larger than 2, where $W_i$ is the number of logical "1" appearing during the period of the series of the first pseudorandom number generated by the i-th pseudorandom number generating circuit.

A pseudorandom number generator for generating cryptographically highly safe pseudorandom numbers according to the present invention which includes a plurality of orderly pseudorandom number generating circuits for generating first pseudorandom numbers generated by the plurality of orderly pseudorandom number generating circuits and generating a second pseudorandom number on the basis of the first pseudorandom numbers generated by the preceding ones of the respective pseudorandom number generating circuits is featured by that each of the plurality of orderly pseudorandom number generating circuits comprises a register for taking in and holding a state data composed of a plurality of bits in synchronism with clock pulses of a clock signal, a first and second function generator circuits for producing a first and second data each composed of a plurality of bits correspondingly to the state data thus held in the register, a selector for selecting and outputting a specific bit of either the first or second data according to the first pseudorandom number generated by the preceding pseudorandom number generating circuit as the first pseudorandom number of the pseudorandom number generating circuit and a second selector for selecting the data of either the first or second data except the specific bit according to the first pseudorandom number generated by the preceding pseudorandom number and sending the selected data to the register as a state data.

Further, the pseudorandom number generator of the present invention is featured by comprising a plurality of function generator circuits, a first function generator circuit being adapted to generate the data according directly to the state data held by the register, the second and subsequent function generator circuits being adapted to generate the data according to the data output from an immediately preceding function generator circuits, respectively, the first function generator circuit being any of the plurality of orderly function generator circuits except the last function generator circuit, the second function generator circuit being the last function generator circuit.

The pseudorandom number generator for generating cryptographically highly safe pseudorandom numbers according to the present invention is further featured by that the first function generator circuit is an $S_0$-th function generator circuit of the plurality of orderly function generator circuits and the second function generator circuit is an $S_1$-th function generator circuit of the plurality of orderly function generator circuits, where $S_0$ and $S_1$ are integers satisfying the inequality $0<S_0<S_1$, that a period $L_i$ of a series of the first pseudorandom number generated by the i-th pseudorandom number generating circuit and $(L_{i-1}-W_{i-1})\times S_0+W_{i-1}\times S_1$ are relatively prime for an arbitrary i and $L_i$ and $L_1 \times L_2 \times \ldots \times L_{i-2}$ are relatively prime for an arbitrary i larger than 2, where $W_i$ is the number of logical "1" appearing during the period of the series of the first pseudorandom number generated by the i-th pseudorandom number generating circuit.

In the pseudorandom number generating method of the present invention, the state data each composed of the plurality of bits are held in the pseudorandom number generating circuits and the first and second data each composed of the plurality of bits are generated correspondingly to the state data thus held. The specific bit of the first data or the second data is selected according to the first pseudorandom number generated by the preceding pseudorandom number generating circuit and is output as the first pseudorandom number. On the other hand, the data of the first data or the second data, except the specific bit, is selected according to the first pseudorandom number generated by the preceding pseudorandom number generating circuit as the state data to be held next.

In the pseudorandom number generator of the present invention, the register of the pseudorandom number generating circuit takes in and holds the state data each composed of the plurality of bits in synchronism with the clock pulse of the clock signal and the first and second function generator circuits output the first and second data each composed of the plurality of bits correspondingly to the state data held in the register, respectively. The first selector selects the specific bit of the first data or the second data output by the respective first and second function generator circuits according to the first pseudorandom number generated by the preceding pseudorandom number generating circuit and outputs it as the first pseudorandom number. On the other hand, the second selector selects the data of the first data or the second data output by the first and second function generator circuits, except the specific bit, according to the first pseudorandom number generated by the preceding pseudorandom number generating circuit and supplies it to the register as the state data.

Therefore, in the present invention, the internal states of the pseudorandom number generating circuits indicated by the state data of the respective pseudorandom number generating circuits are changed regardless of the pseudorandom numbers generated by the preceding pseudorandom number generating circuits and, therefore, the lock-in problem does not occur.

In the pseudorandom number generating method and the pseudorandom number generator for generating cryptographically highly safe pseudorandom numbers according to the present invention, the first data are the first function generator circuit are the $S_0$-th data of the plurality of data and the $S_0$-th function generator circuit of the plurality of orderly function generator circuits, respectively, and the second data and the second function generator circuit are the $S_1$-th data of the plurality of data and the $S_1$-th function generator circuit of the plurality of orderly function generator circuits, respectively, and $S_0$, $S_1$ and the period $L_i$ of the first pseudorandom number series generated by the i-th pseudorandom number generating circuit are selected such that $L_1$ and $(L_{i-1}-W_{i-1})\times S_0+W_{i-1}\times S_1$ are relatively prime for an arbitrary i and $L_i$ and $L_1 \times L_2 \times \ldots L_{i-2}$ are relatively prime for an arbitrary i larger than 2, where $W_i$ is the number of logical "1" appearing during the period of the series of the first pseudorandom number generated by the i-th pseudorandom number generating circuit.

Therefore, in the present invention, it is possible to generate a pseudorandom number series having maximum period.

DETAILED DESCRIPTION OF THE PREFERRED EMBODIMENTS

Figure 5:
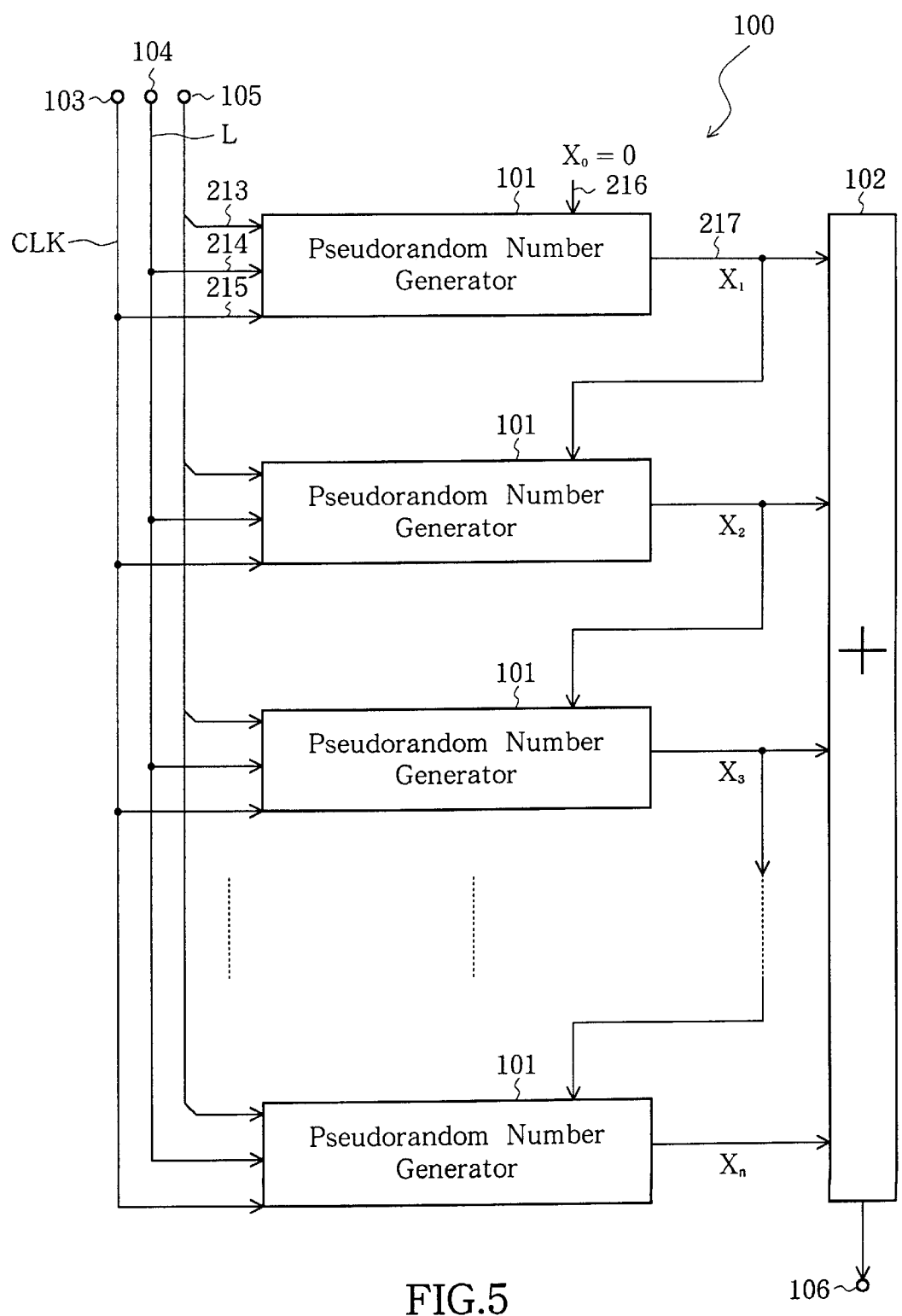
FIG. 5 is a functional block diagram showing a basic construction of an example of a pseudorandom number generator according to the present invention.
Figure 6:
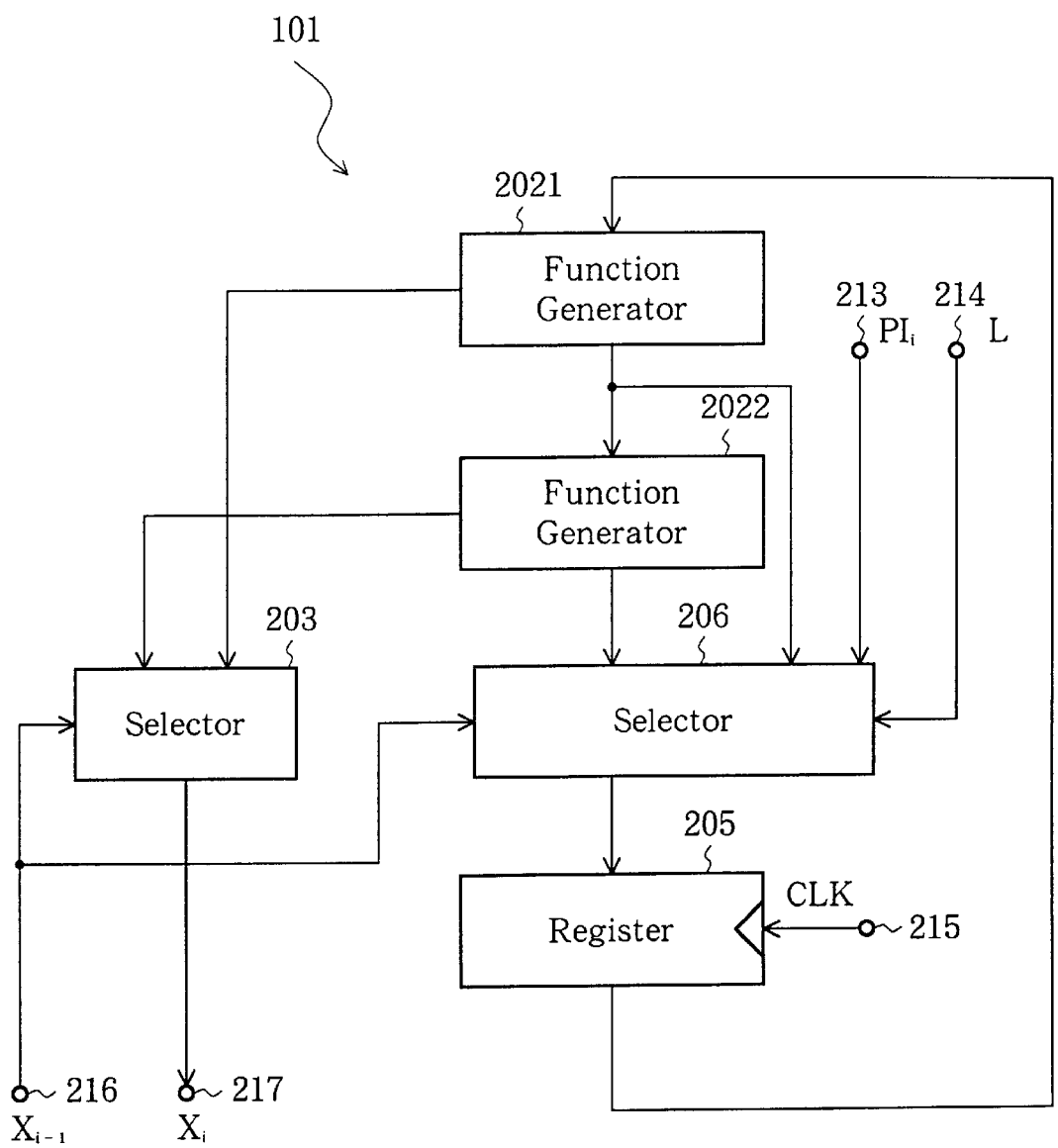
FIG. 6 is a functional block diagram showing a pseudorandom number generating circuit constituting the pseudorandom number generator shown in FIG. 5.

FIG. 5 is a functional block diagram showing a basic construction of an example of a pseudorandom number generator according to the present invention and FIG. 6 is a functional block diagram showing one of pseudorandom number generating circuits constituting the pseudorandom number generator shown in FIG. 5. The pseudorandom number generating method according to the present invention will be described with reference to the pseudorandom number generator shown in these figures.

The pseudorandom number generator 100 shown in FIG. 5 includes a plurality of pseudorandom number generating circuits 101 and a clock signal CLK and a control signal L are input to these pseudorandom number generating circuits 101 through an input terminal 103 and an input terminal 104, respectively. Further, different m-bit data are input to the pseudorandom number generating circuits 101 through an input terminal 105 and held initially therein, respectively.

An i-th pseudorandom number generating circuit 101 generates a pseudorandom number $X_i$ (referred to as "first pseudorandom number") and the first pseudorandom number is input to a next, the (i+1)th pseudorandom number generating circuit 101 as a state control signal, where i=1, 2, ..., n, where n is a positive integer. A state control signal ($X_0$) whose logical value is constant (in this embodiment, logical "0") is input to the first pseudorandom number generating circuit 101.

The pseudorandom number generator shown in FIG. 5 further includes an Exclusive OR circuit 102 which provides an exclusive logical sum of the pseudorandom numbers $X_1$ to $X_n$ generated by all of the pseudorandom number generating circuits 101 and outputs the exclusive logical sum through an output terminal 106 as a pseudorandom number (referred to as "second pseudorandom number") generated by the pseudorandom number generator 100.

As shown in FIG. 6, each pseudorandom number generating circuit 101 includes a register 205, function generator circuits 2021 and 2022 and selectors 203 and 206 and has a function of skipping an internal state of the register 205 as to be described in detail later. The register 205 takes in an m-bit data output by the selector 206 as a data (referred to as "state data") indicative of the internal state thereof and outputs data held therein to the function generator circuit 2021 every time it receives a clock pulse of the clock signal CLK through a terminal 215.

The function generator circuit 2021 converts the m-bit data supplied from the register 205 into an (m+1)-bit data in a predetermined manner, supplies m bits of the converted (m+1)-bit data to the function generator circuit 2022 and the selector 206 and supplies the remaining 1 bit (referred to as "specific bit") to the selector 203.

The function generator circuit 2022 which has the same construction as that of the function generator circuit 2021 converts the m-bit data supplied from the function generator circuit 2021 into an (m+1)-bit data in a predetermined manner, supplies m bits of the converted (m+1)-bit data to the selector 206 and supplies the remaining 1 bit to the selector 203. Incidentally, since the function generator circuit 2022 generates a new data on the basis of the data from the function generator circuit 2021, it can be said that the new data is generated correspondingly to the data held by the register 205.

The selector 206 selects and outputs a m-bit data $P_{Ii}$ supplied from an input terminal 213 when the control signal L supplied from an input terminal 214 is logical "0". On the other hand, the selector 206 selects and outputs the output data of the function generator circuit 2021 when the control signal L supplied from an input terminal 214 is logical "1" and the pseudorandom number $X_{i-1}$ (state control signal) supplied from the (i−1)th pseudorandom number generating circuit 101 through an input terminal 216 is logical "0" and selects and outputs the output data of the function generator circuit 2022 when the control signal L supplied from an input terminal 214 is logical "1" and the pseudorandom number $X_{i-1}$ supplied from the input terminal 216 is logical "1".

The selector 203 selects and outputs the output of the function generator circuit 2021 when the pseudorandom number $X_{i-1}$ supplied from the input terminal 216 is logical "0" and selects and outputs the output data of the function generator circuit 2022 when the pseudorandom number $X_{i-1}$ supplied from the input terminal 216 is logical "1". The output of the selector 203 is output from the output terminal 217 as the pseudorandom number $X_i$ generated by the i-th pseudorandom number generating circuit 101.

When the control signal L which is logical "0" is input to the i-th pseudorandom number generating circuit 101 first, the data $P_{Ii}$ supplied through the input terminal 213 is input to the selector 206 and then to the register 205 and, when a clock pulse of the clock signal CLK is input through the input terminal 215 to the register 205 in this state, the register 205 takes in and holds the data $P_{Ii}$ as the initial state data.

Then, the control signal L is set to logical "1". Thereafter, the selectors 203 and 206 select the 1-bit data and the m-bit data output from either the function generator circuit 2021 or the function generator circuit 2022 according to the logical value of the pseudorandom number $X_{i-1}$, generated by the preceding pseudorandom number generating circuit 101 and output them to the output terminal 217 and the register 205, respectively.

Thus, the data held in the register 205 is converted by the function generator circuits 2021 and 2022 and the data of one of the function generator circuits 2021 and 2022 is input to the register 205 through the selector 206. The register takes in and holds the input data as data indicative of a new state every time a clock pulse of the clock signal CLK is received.

Therefore, in this pseudorandom number generating circuit 101, the register 205 takes in and holds the input data regardless of the logical value of the pseudorandom number $X_{i-1}$ generated by the preceding pseudorandom number generating circuit 101 and, therefore, the internal state of the register 205 is always changed by every clock pulse and the pseudorandom number $X_i$ is output from the output terminal 217 correspondingly to the change of the internal state of the register 205.

Since the selector 206 selects the output data of the function generator circuit 2022 when the pseudorandom number $X_{i-1}$ (state control signal) supplied from the (i−1)th pseudorandom number generating circuit 101 through the input terminal 216 is logical "1", the data output from the function generator circuit 2021 as the data indicative of the internal state when the pseudorandom number $X_{i-1}$ is logical "0" is skipped and the output data of the function generator circuit 2022 is held in the register 205.

An operation of the pseudorandom number generator 100 shown in FIG. 5 and constructed as mentioned above will be described.

First, in order to initialize the internal states of the pseudorandom number generating circuits 101, different data each of m bits are supplied to the respective pseudorandom number generating circuits 101 through the input terminal 105, the control signal L of logical "0" is supplied to them through the input terminal 104 and the clock signal CLK is supplied to them through the input terminal 103. As a result, the different m-bit data supplied through the input terminal 105 are held in the registers 205 (FIG. 6) of the respective pseudorandom number generating circuits 101 through the selectors 206 thereof.

Then, the pseudorandom number generator 100 is set to the usual operation state by supplying the control signal L of logical "1" to the input terminal 104 and supplying the clock signal CLK to the input terminal 103. Thus, the register 205 of each pseudorandom number generating circuit 101 takes in the data which is generated by the function generator circuits 2021 and 2022 and is indicative of the new state through the selector 206 and holds it every time the clock pulse of the clock signal CLK is received, as mentioned above. In this case, the selector 206 selects the data generated by either the function generator circuit 2021 or 2022 according to the logical value of the pseudorandom number $X_{i-1}$ (state control signal) generated by the preceding pseudorandom number generating circuit 101 and supplies it to the register 205.

Therefore, in each pseudorandom number generating circuit 101, the register 205 takes in and holds the new data every time when each clock pulse of the clock signal CLK is received, regardless of whether the logical value of the pseudorandom number $X_{i-1}$ generated by the preceding pseudorandom number generating circuit 101 is "0" or "1", and, therefore, the internal state of the register 205 is always changed by every clock pulse.

The function generator circuits 2021 and 2022 of each pseudorandom number generating circuit 101 generate the 1-bit data dependent on the internal state of the register 205 and output them to the selector 203. The selector 203 selects one of the 1-bit data from the function generator circuits 2021 and 2022 according to the logical value of the pseudorandom number $X_{i-1}$ generated by the preceding pseudorandom number generating circuit 101 and outputs it through the output terminal 217 as the pseudorandom number $X_i$.

The Exclusive OR circuit 102 provides an exclusive logical sum of the pseudorandom numbers $X_1$ to $X_n$ generated by all of the pseudorandom number generating circuits 101 and outputs the exclusive logical sum through the output terminal 106 as a pseudorandom number generated by the pseudorandom number generator 100.

As described, since the internal state of each pseudorandom number generating circuit 101 of the pseudorandom number generator 100 according to this embodiment is always changed regardless of the logical value of the pseudorandom number (state control signal) generated by the preceding pseudorandom number generating circuit, there is no lock-in problem occur.

Therefore, the pseudorandom number generator 100 can generate pseudorandom numbers which are cryptographically highly safe.

Further, since it is possible to highly safe pseudorandom numbers without using a large number of pseudorandom number generating circuits 101, it becomes possible to reduce the size as well as cost of the pseudorandom number generator.

Although, in this embodiment, two function generator circuits are used in each pseudorandom number generating circuit 101 of the pseudorandom number generator 100, it is possible to arrange more than two function generator circuits in each pseudorandom number generating circuit.

Figure 7:
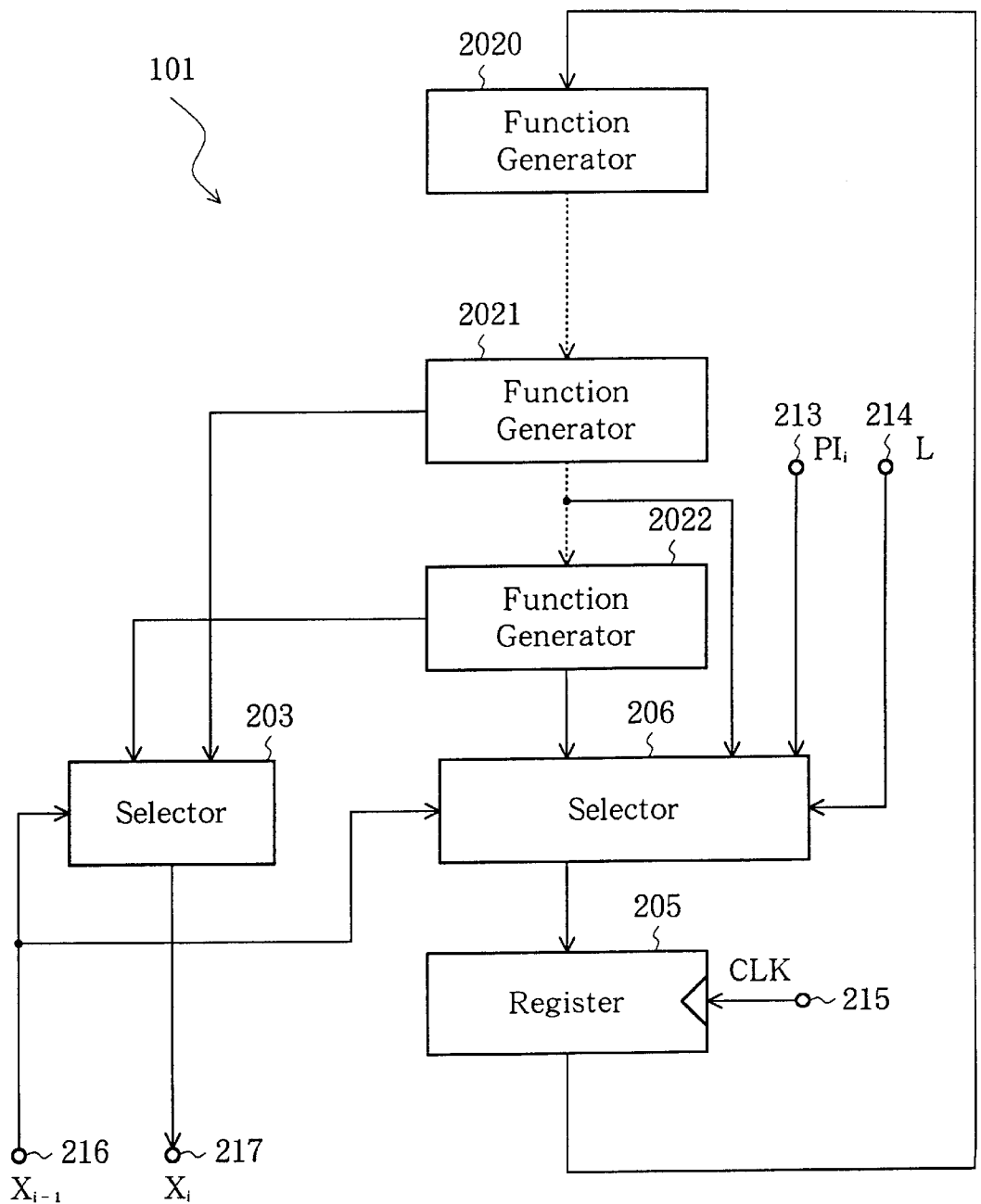
FIG. 7 is a functional block diagram showing a pseudorandom number generating circuit using function generator circuits the number of which is larger than that in the pseudorandom number generating circuit shown in FIG. 6.

FIG. 7 shows a modification of the pseudorandom number generating circuit of the embodiment shown in FIG. 6, which includes more than two function generator circuits. In the pseudorandom number generating circuit 110 shown in FIG. 7, output data ((m+1)-bit data) of the $S_0$-th function generator circuit 2021 counted from the first function generator circuit 2020 to which data held in the register 205 is supplied and of the $S_1$-th (the last) function generator circuit 2022 are supplied to the selectors 203 and 206, where $S_0$ and $S_1$ are integers which satisfy the inequality $$0 < S_0 < S_1.$$

Similarly to the pseudorandom number generating circuit 101, the register 205 of the i-th pseudorandom number generating circuit 110 always takes in and holds a new data every time when a clock pulse of the clock signal CLK is input regardless of the logical value of the pseudorandom number $X_{i-1}$ generated by the preceding pseudorandom number generating circuit and, therefore, the internal state of the register 205 is changed every clock pulse. A pseudorandom number $X_i$ is output from the output terminal 217 correspondingly to such change of the internal state of the register 205. Therefore, it is possible to generate pseudorandom numbers by using the pseudorandom number generating circuits 110 without the lock-in problem.

However, since the number of the function generator circuits of the pseudorandom number generating circuit 110 is larger than that of the circuit shown in FIG. 6, the pseudorandom number generator using the pseudorandom number generating circuits 110 may be disadvantageous in the size and cost of the pseudorandom number generator. Therefore, the pseudorandom number generating circuit 101 shown in FIG. 6 is optimal in that both the reduction of the size of the pseudorandom number generator and the cryptographical safety of pseudorandom numbers can be achieved.

Incidentally, when $S_0=1$ and $S_1=2$, the construction of the pseudorandom number generating circuit 110 becomes the same as that of the pseudorandom number generating circuit 101.

Although, in the above description of the pseudorandom number generator 100 according to this embodiment, the numbers of bits of the data indicative of the internal states of the registers 205 of the respective pseudorandom number generating circuits 101 are constantly m, it is possible to make the number of bits of the data different between the respective pseudorandom number generating circuits 101. Even in such case, the respective pseudorandom number generating circuits 101 operate basically in the same manner as mentioned above to generate pseudorandom numbers and the final pseudorandom numbers are obtained by the Exclusive OR circuit 102 which calculates the exclusive logical sum of the outputs of the respective pseudorandom number generating circuits.

Further, by making the number of bits indicative of the register of each pseudorandom number generating circuit different from the others, the quality of the thus generated final pseudorandom numbers is improved, so that the cryptographical safeness thereof is further improved.

Further, it is possible to further improve the performance of the pseudorandom number generator 100 by optimizing the parameters in such a manner to be described below. For the purpose of generalization, it is assumed that the pseudorandom number generator 100 is constructed with the pseudorandom number generating circuits 101 and the bit numbers of data indicative of the internal states of the registers of the respective pseudorandom number generating circuits are arbitrarily set for the respective pseudorandom number generating circuits.

Further, $S_0$, $S_1$ and the period $L_i$ of the series of the pseudorandom number generated by the i-th pseudorandom number generating circuit 110 are selected such that $L_i$ and $(L_{i-1}-W_{i-1}) \times S_0 + W_{i-1} \times S_1$ are relatively prime for an arbitrary i and $L_i$ and $L_1 \times L_2 \times \ldots \times L_{i-2}$ are relatively prime for an arbitrary i larger than 2, where $W_i$ is the number of logical "1" appearing in the period of the series of the pseudorandom number generated by the i-th pseudorandom number generating circuit.

Incidentally, when the pseudorandom number generator 100 is constructed with the pseudorandom number generating circuits 101 each having the construction shown in FIG. 6, $S_0=1$ and $S_1=2$. Therefore, it is enough that only the period $L_i$ is selected such that it satisfies the above mentioned conditions.

It is possible to maximize the period of the pseudorandom number series output from the pseudorandom number generator 100 by setting $S_0$, $S_1$ and the period $L_i$ in such manner.

The reason for this possibility will be described. In FIG. 5, it is assumed that the period of a pseudorandom number $X_{i-1}$ is $L_1 \times L_2 \times \ldots \times L_{i-1}$ and a ratio between the number of logical "0" and the number of logical "1" appearing in one period of the a pseudorandom number $X_{i-1}$ is $(L_{i-1}-W_{i-1})$: $W_{i-1}$. In such case, the internal state of the i-th pseudorandom number generating circuit 110 (101) is updated by an amount corresponding to $\{(L_{i-1}-W_{i-1}) \times S_0 + W_{i-1} S_1\} \times L_1 \times L_2 \times \ldots \times L_{i-2}$ clock pulses after a time $L_1 \times L_2 \times \ldots \times L_{i-1}$.

Since, when $S_0$, $S_1$ and the period $L_i$ of the series of the pseudorandom number generated by the i-th pseudorandom number generating circuit 110 are selected such that $L_i$ and $(L_{i-1}-W_{i-1}) \times S_0 + W_{i-1} \times S_1$ are relatively prime for an arbitrary i and $L_i$ and $L_1 \times L_2 \times \ldots \times L_{i-2}$ are relatively prime for an arbitrary i larger than 2, the pseudorandom number $X_{i-1}$ and the internal state of the i-th pseudorandom number generating circuit 110 (101) are cycled once simultaneously after the time $L_1 \times L_2 \times \ldots \times L_{i-1} \times L_i$, the period of the pseudorandom number $X_i$ is $L_1 \times L_2 \times \ldots \times L_{i-1} \times L_i$ during which the internal state of the i-th pseudorandom number generating circuit 100 (101) is skipped constant times. Therefore, the ratio in number between the logical "0" and the logical "1" appearing in one period of the pseudorandom number $X_i$ becomes $(L_i-W_i)$: $W_i$. Incidentally, since this assumption is established in the case where i=2, the above consideration can be applied to the cases where i=2, 3, ..., n. Therefore, the period of the pseudorandom number $X_n$ (that is, the period of the pseudorandom number generated by the pseudorandom number generator 100) becomes $L_1 \times L_2 \times \ldots L_n$. This period is equal to the maximum period of pseudorandom numbers obtained by combining the pseudorandom number generating circuits each having period $L_i$.

Therefore, in the pseudorandom number generator 100 of this embodiment, it is possible to maximize the period of the pseudorandom number series output of the pseudorandom number generator 100 by selecting $S_0$, $S_1$ and the period $L_i$ such that these satisfy the previously mentioned conditions.

Figure 1:
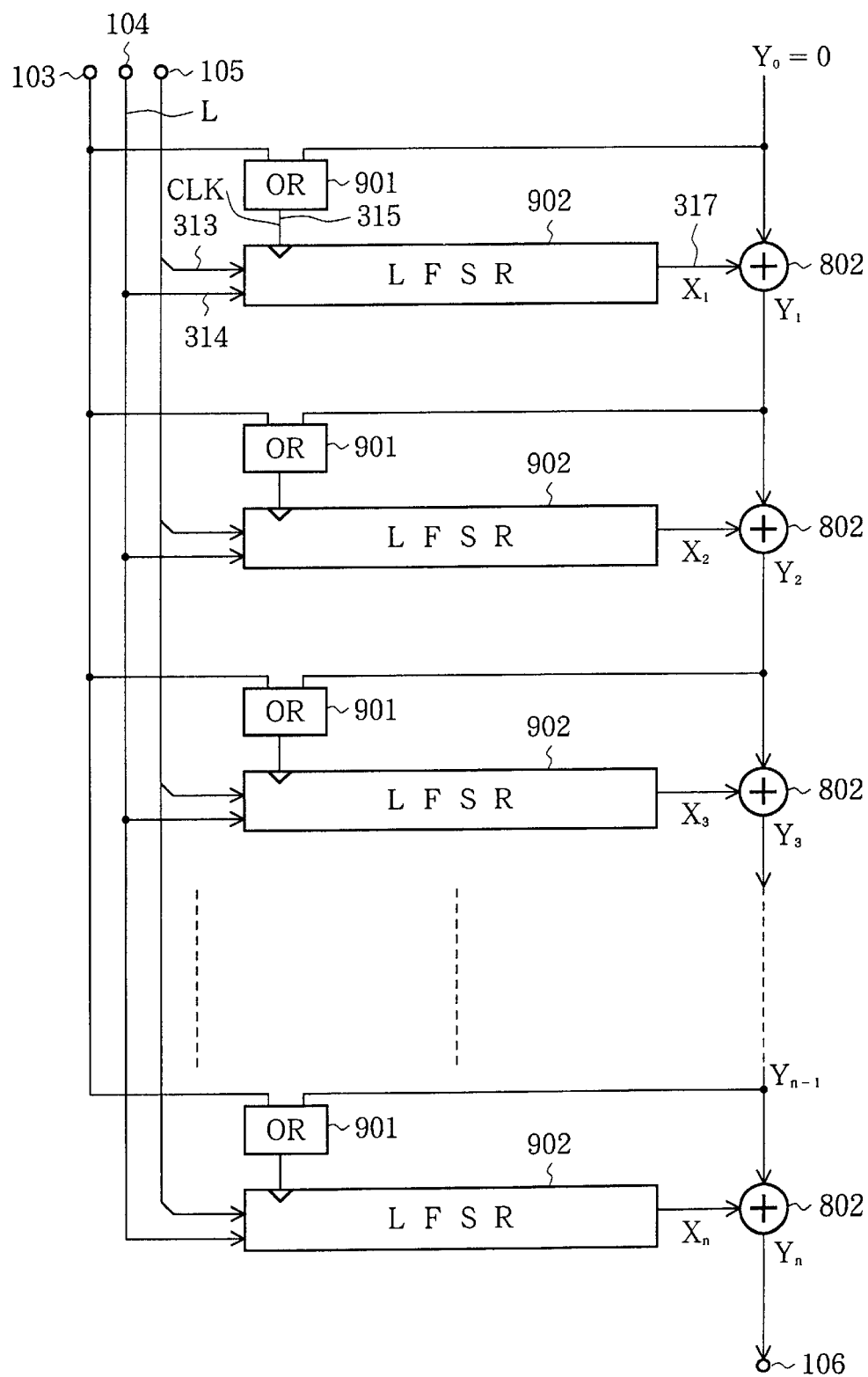
FIG. 1 is a functional block diagram showing a basic construction of a conventional pseudorandom number generator constructed with cascade-connected linear feedback shift registers (LFSR's)

Incidentally, when $S_0=0$ and $S_1=1$ in the pseudorandom number generating circuit shown in FIG. 7, the construction of the pseudorandom number generating circuit 101 becomes the same as that of the pseudorandom number generating circuit 902 shown in FIG. 1. In such case, the internal state of the pseudorandom number generating circuit 101 is updated correspondingly to $W_{i-1} \times L_1 \times L_2 \times \ldots \times L_{i-2}$ clock pulses after the time $L_1 \times L_2 \times \ldots \times L_{i-1}$. However, since, in the conventional pseudorandom number generator shown in FIG. 1, the internal state of the pseudorandom number generator is not always updated and it can not be said that the update corresponding to $W_{i-1} \times L_1 \times L_2 \times \ldots \times L_{i-2}$ clock pulses is always just performed, the above consideration can not be applied.

In the pseudorandom number generator 100, the final pseudorandom numbers is obtained by calculating the exclusive logical sum of the pseudorandom numbers generated by the respective pseudorandom number generating circuits 101, by means of the Exclusive OR circuit 102. Alternatively, it is possible to generate the final pseudorandom numbers by operating the pseudorandom numbers generated by the pseudorandom number generating circuits 101 in other means than the Exclusive OR circuit, although the Exclusive OR operation is optimal in views of the cryptographical safeness of pseudorandom numbers and the reduction of the generator size.

Figure 8:
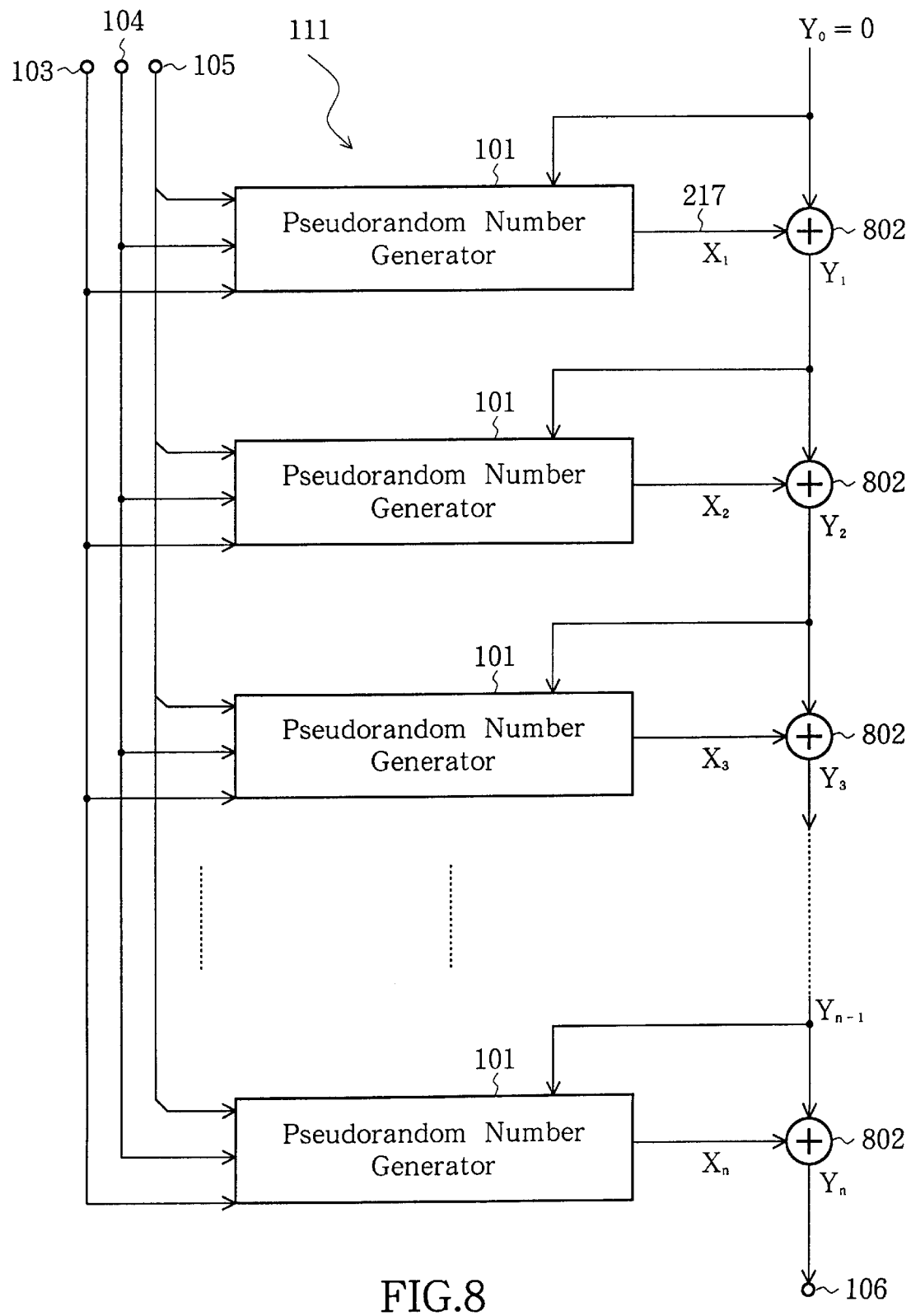
FIG. 8 is a functional block diagram showing an embodiment of the present invention in which an Exclusive OR circuit is provided in each pseudorandom number generating circuit.

Alternatively, it is possible to provide an Exclusive OR circuit for each pseudorandom number generating circuit 101. FIG. 8 is a functional block diagram showing another embodiment of the present invention, in which, instead of the single Exclusive OR circuit 102, a plurality of Exclusive OR circuits are provided for the respective pseudorandom number generating circuits.

In FIG. 8, a pseudorandom number generator 111 includes Exclusive OR circuits 802 provided correspondingly to the respective pseudorandom number generating circuits 101. To one input terminal of the i-th Exclusive OR circuit 802, a pseudorandom number $Y_{i-1}$ output from an (i-1)th Exclusive OR circuit 802 is input and a pseudorandom number $X_i$ generated by the i-th pseudorandom number generating circuit 101 is input to the other input terminal of the i-th Exclusive OR circuit 802. A pseudorandom number $Y_{i-1}$ output from the (i-1)th Exclusive OR circuit 802 is input to the i-th pseudorandom number generating circuit 101 as a state control signal. Further, a pseudorandom number $Y_n$ output from the last Exclusive OR circuit 802 is output through the output terminal 106 as an output pseudorandom numbers of the pseudorandom number generator 111.

Since the nature of the pseudorandom numbers $X_i$ and $Y_i$ are the same even in this construction, the pseudorandom number generator 111 operates similarly to the pseudorandom number generator 100, with similar effect to that of the pseudorandom number generator 100. In the pseudorandom number generator 111, it is possible to mount the pseudorandom number generating circuit and the Exclusive OR circuit 802 as a single integrated circuit and the pseudorandom number generator having a desired safeness can be easily constructed by cascade-connecting the integrated circuits each including the pseudorandom number generating circuit and the Exclusive OR circuit.

Figure 2:
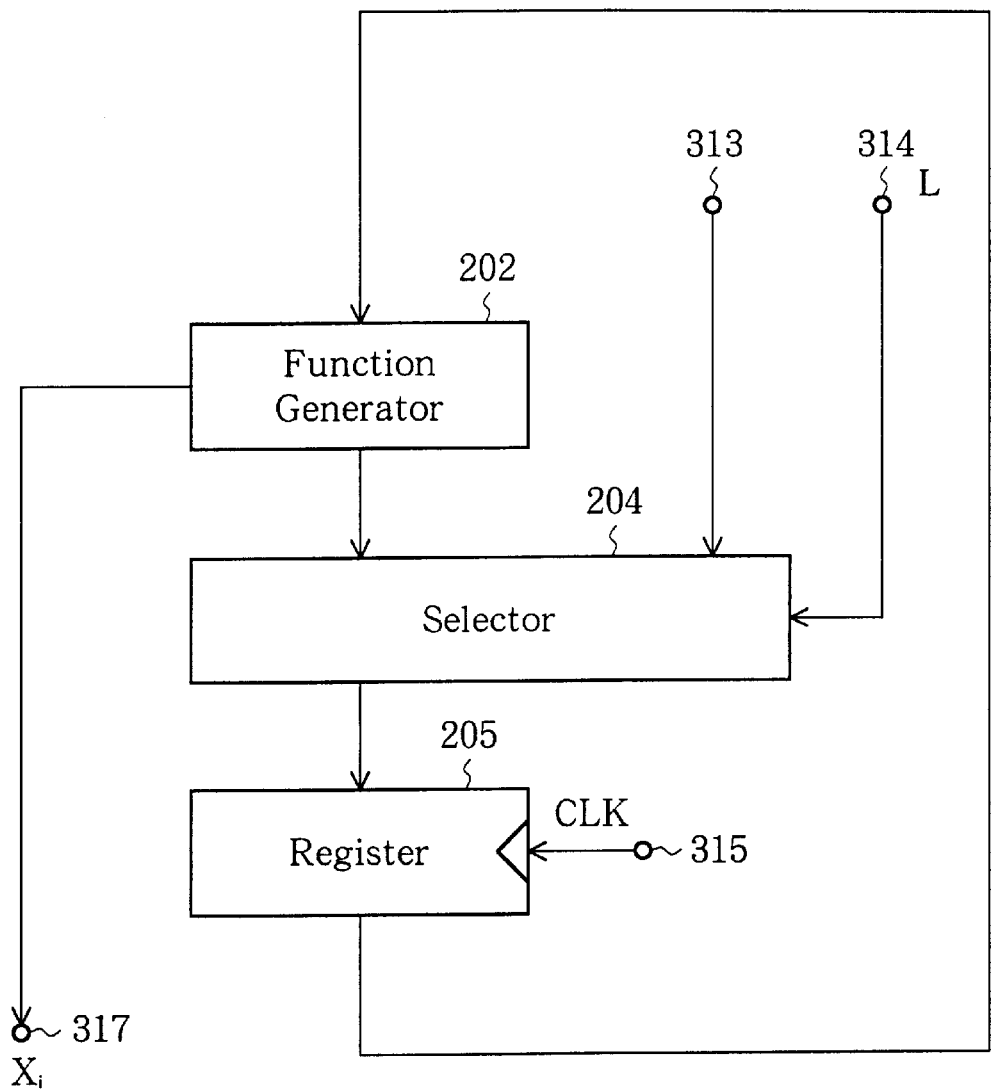
FIG. 2 is a functional block diagram showing an example of a conventional basic construction of a pseudorandom number generating circuit.

Each of the pseudorandom number generating circuits 101 constituting the pseudorandom number generator shown in FIG. 5 corresponds to a modification of the conventional pseudorandom number generating circuit shown in FIG. 2 in which a plurality of function generator circuits are used to provide the internal state skip function. Since, therefore, the basic construction of the non-linear feedback shift register shown in FIG. 3 is the same as that of the pseudorandom number generating circuit shown in FIG. 2, it is possible to use the non-linear feedback shift registers in the pseudorandom number generator 100 in lieu of the pseudorandom number generating circuits 101 by easily providing the skip function thereto similarly.

Figure 3:
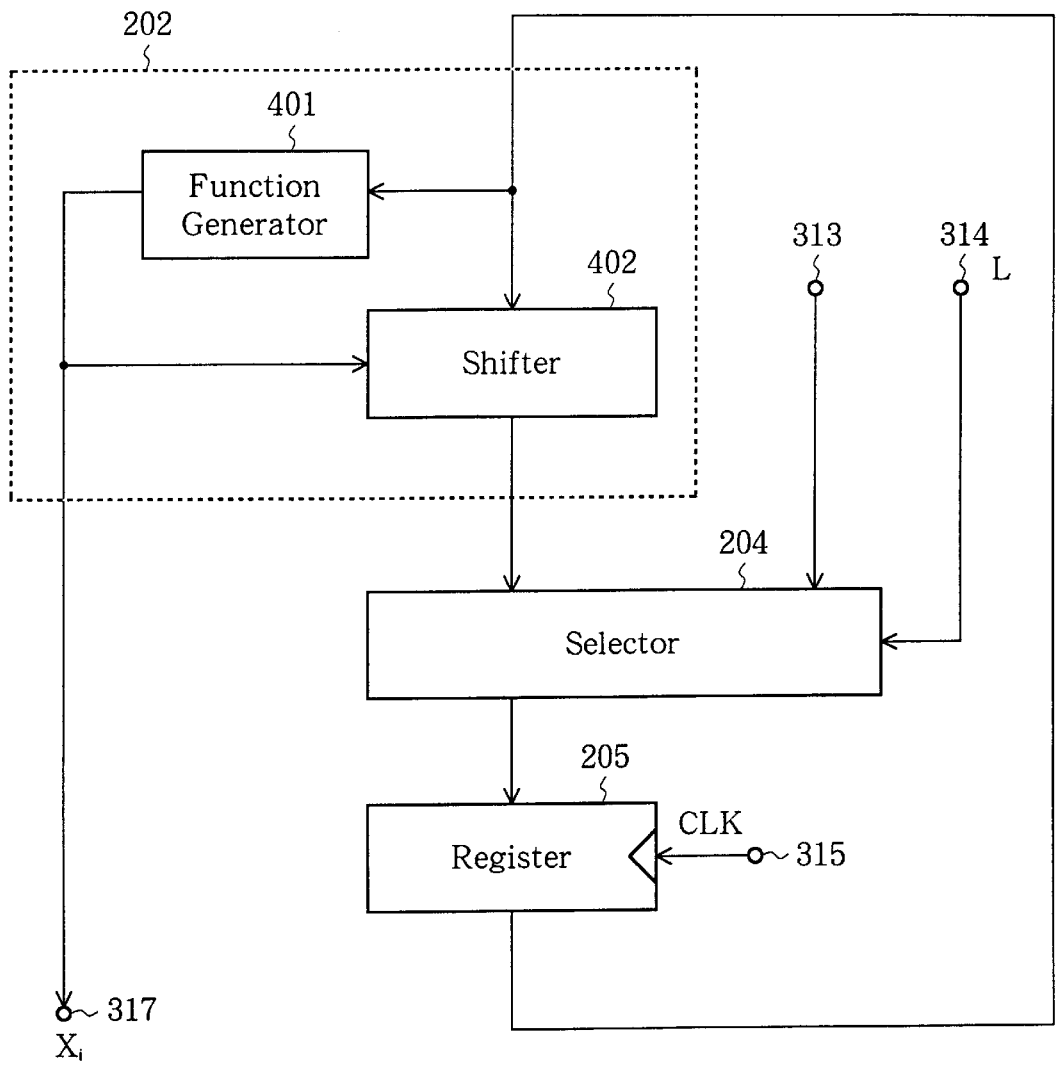
FIG. 3 is a functional block diagram showing a basic construction of a conventional pseudorandom number generating circuit called as non-linear feedback shift register.

In such case where the non-linear feedback shift registers each shown in FIG. 3 are provided with the skip functions, respectively, the construction of the function generator circuit becomes simple, which is advantageous in reducing the size of the pseudorandom number generator.

Figure 4:
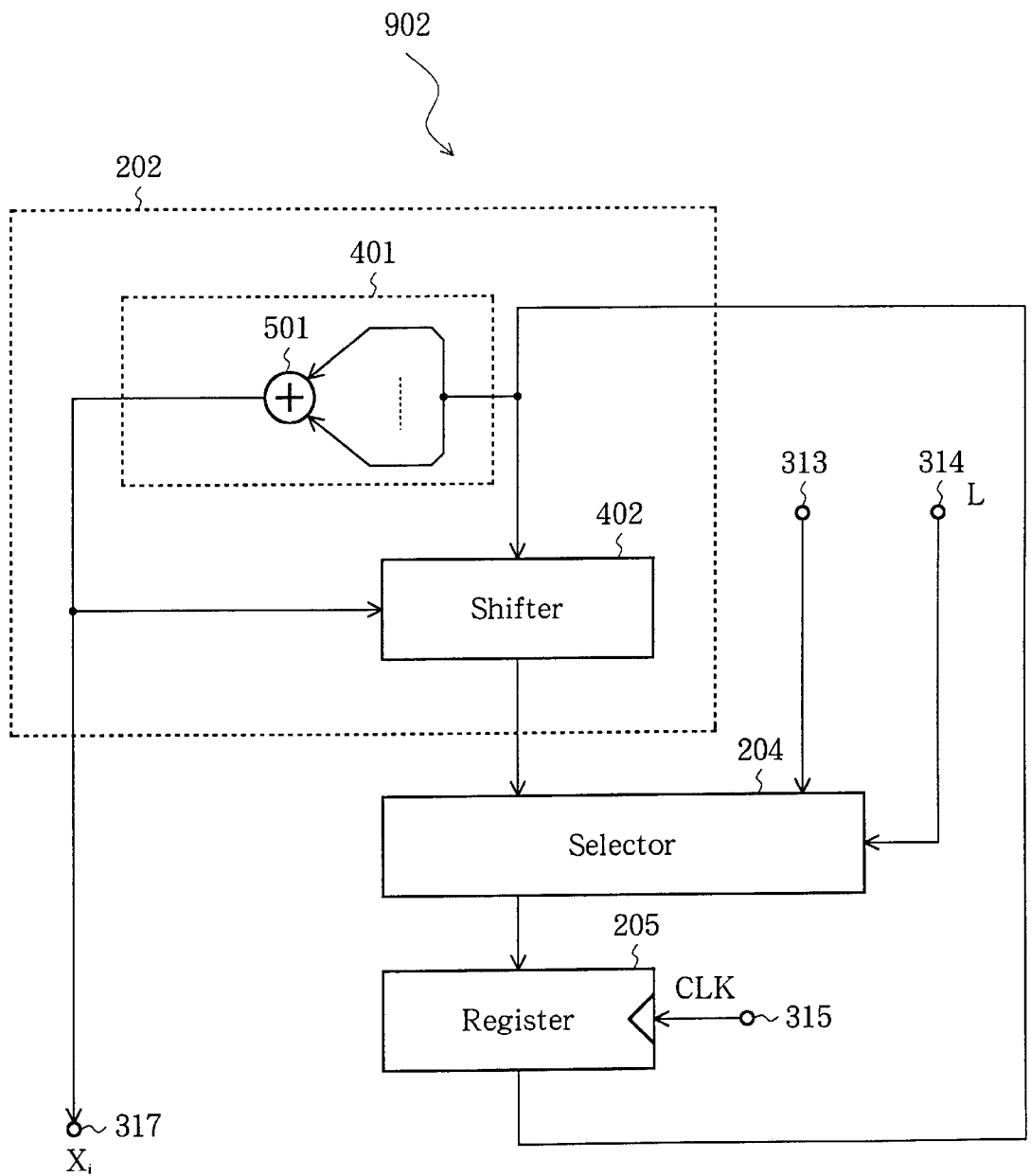
FIG. 4 is a functional block diagram showing a basic construction of a linear feedback shift register constituting the pseudorandom number generator-shown in FIG. 1.

Further, it is similarly possible to easily give the internal state skip function to the LFSR shown in FIG. 4 and hence to use it in lieu of the pseudorandom number generating circuit 101. Since the construction of the function generator circuit becomes simpler even in such case, the construction is effective in reducing the size of the generator.

The m-bit data supplied to the selector 206 of the pseudorandom number generating circuit 101 shown in FIG. 6 and hence the m-bit data supplied to the register 205 may be either a serial data or a parallel data.

When the numbers of bits of the data indicative of the internal state to be used in the respective pseudorandom number generating circuits 101 are different from each other and data of $m_1$ bits, $m_2$ bits, ..., $m_n$ bits are initially supplied to the first to the n-th pseudorandom number generating circuits 101, respectively, it is possible to supply these data to the input terminal 213 as a bit train of $m_1+m_2+, ..., +m_n$ bits and hold the bit train portions thereof in the registers 205 of the respective pseudorandom number generating circuits 101.

A second embodiment of the present invention will be described.

Figure 9:
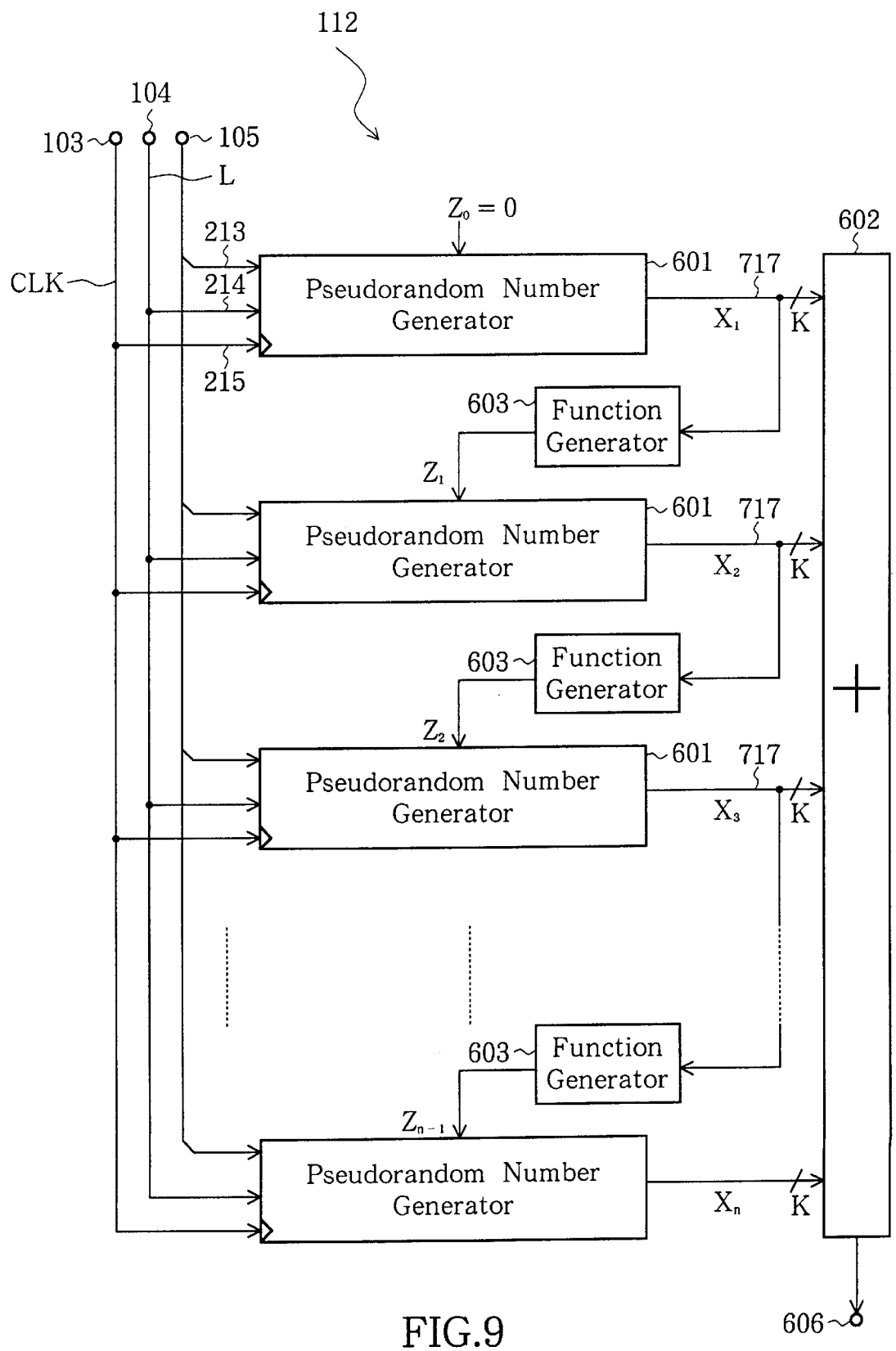
FIG. 9 is a functional block diagram showing a basic construction of a pseudorandom number generator according to another embodiment of the present invention.
Figure 10:
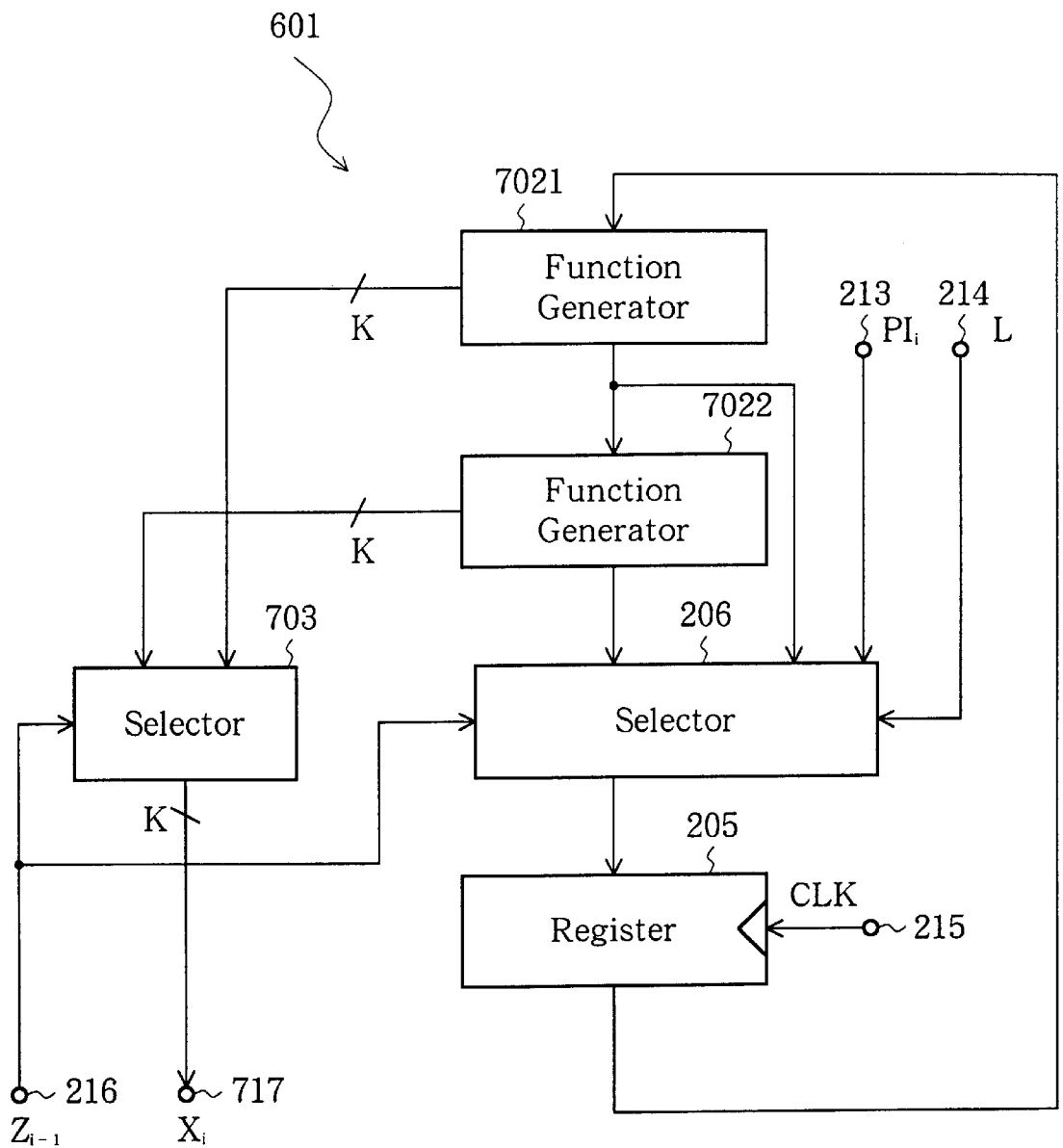
FIG. 10 is a functional block diagram showing a pseudorandom number generating circuit constituting the pseudorandom number generator shown in FIG. 9.

FIG. 9 is a functional block diagram showing a basic construction of an example of a pseudorandom number generator according to the second embodiment of the present invention and FIG. 10 is a functional block diagram showing one of pseudorandom number generating circuits constituting the pseudorandom number generator shown in FIG. 9. In these figures, the same components as those shown in FIGS. 5 and 6 are depicted by the same reference numerals, respectively, without detailed descriptions thereof In FIGS. 9 and 10, the pseudorandom number generator 112 differs from the pseudorandom number generator 100 shown in FIG. 5 in function that each pseudorandom number is generated as a multi-bit data and in construction that each pseudorandom number generating circuit 601 has a different construction from that of the generator 100 and a function generator circuit 603 is newly provided for each pseudorandom number generating circuit 601.

As shown in FIG. 9, the pseudorandom number generator 112 includes a plurality of the pseudorandom number generating circuits 601 for generating a multi-value pseudorandom numbers and the clock signal CLK and the control signal L are supplied to the pseudorandom number generating circuits 601 through an input terminal 103 and an input terminal 104, respectively. A m-bit data is supplied from an input terminal 105 to the generator 112 and is initially held by each of the pseudorandom number generating circuits 601.

The i-th pseudorandom number generating circuit 601 generates a pseudorandom number $X_i$ (k-bit data, where k is a positive integer) and this pseudorandom number is input to the function generator circuit 603 corresponding to the i-th pseudorandom number generating circuit 601. The function generator 603 converts the pseudorandom number $X_i$ into a 1-bit data in a predetermined manner and outputs the 1-bit data to the next, (i+1)th pseudorandom number generating circuit 601 as a pseudorandom number $Z_i$ (state control signal). Incidentally, a state control signal ($Z_0$) whose logical value is constant (in this embodiment, logical "0") is input to the first pseudorandom number generating circuit 601.

An Exclusive OR circuit 602 provides an exclusive logical sum of the pseudorandom numbers $X_1$ to $X_n$ generated by all of the pseudorandom number generating circuits 601 and outputs the exclusive logical sum through an output terminal 606 as a k-bit pseudorandom number generated by the pseudorandom number generator 112.

As shown in FIG. 10, the i-th pseudorandom number generating circuit 601 includes a register 205, function generator circuits 7021 and 7022 and selectors 703 and 206. The register 205 holds an m-bit data output from the selector 206 as a data (referred to as "state data") indicative of the internal state thereof and outputs data held therein to the function generator circuit 7021 every time it receives a clock pulse of the clock signal CLK.

The function generator circuit 7021 converts the m-bit data supplied from the register 205 into an (m+k)-bit data in the predetermined manner, supplies m bits of the converted (m+k)-bit data to the function generator circuit 7022 and the selector 206 and supplies the remaining k bit (referred to as "specific bit") to the selector 703.

The function generator circuit 7022 which has the same construction as that of the function generator circuit 7021 converts the m-bit data supplied from the function generator circuit 7021 into an (m+k)-bit data similarly, supplies m bits of the converted (m+k)-bit data to the selector 206 and supplies the remaining k bit to the selector 703. Incidentally, since the function generator circuit 7022 generates a new data on the basis of the data from the function generator circuit 7021, it can be said that the new data is generated correspondingly to the data held by the register 205.

The selector 703 selects and outputs the output of the function generator circuit 7021 when the pseudorandom number $Z_{i-1}$ (state control signal) supplied from the preceding pseudorandom number generating circuit 601 through the input terminal 216 is logical "0" and selects and outputs the output of the function generator circuit 7022 when the pseudorandom number $Z_{i-1}$ supplied from the preceding pseudorandom number generating circuit through the input terminal 216 is logical "1". The output of this selector 703 is output from an output terminal 717 as the k-bit pseudorandom number $X_i$ generated by the pseudorandom number generating circuit 601.

Since, also in the pseudorandom number generating circuit 601, the selector 206 selects and outputs the output of the function generator circuit 7022 when the pseudorandom number $Z_{i-1}$ supplied from the preceding pseudorandom number generating circuit through the input terminal 216 is logical "1", the data output from the function generator circuit 7021 as the data indicative of the next internal state when the state control signal $Z_{i-1}$ is logical "0" is skipped and the output data of the function generator circuit 7022 is held in the register 205.

In this pseudorandom number generating circuit 601, when the control signal L of logical "0" is input first, the data $P_{Ii}$ supplied from an input terminal 213 is input to the register 205 through the selector 206 and a clock pulse of the clock signal CLK supplied from the input terminal 215 is input to the register 205, the register takes in and holds the data $P_{Ii}$ as the initial state data.

Then, the control signal L is set to logical "1". Thereafter, the selectors 703 and 206 select the k-bit data and the m-bit data output from either the function generator circuit 7021 or the function generator circuit 7022 according to the logical value of the pseudorandom number $Z_{i-1}$ generated by the preceding function generator circuit 601 and output them to the output terminal 717 and the register 205, respectively.

Thus, the data held in the register 205 is converted by the function generator circuit 7021 and 7022 and the data of one of the function generator circuits 7021 and 7022 is input to the register 205 through the selector 206. The register 205 takes in and holds the input data as data indicative of a new state every time a clock pulse of the clock signal CLK is received.

Therefore, in this pseudorandom number generating circuit 601, the register 205 always takes in and holds the new data regardless of the logical value of the pseudorandom number $Z_{i-1}$ generated by the preceding function generator circuit 601 every time a clock pulse of the clock signal CLK is received and, therefore, the internal state of the register 205 is always changed by every clock pulse and the k-bit pseudorandom number $X_i$ is output from the output terminal 217 correspondingly to the change of the internal state of the register 205.

An operation of the pseudorandom number generator 112 constructed as mentioned above will be described.

First, in order to initialize the internal states of the pseudorandom number generating circuits 601, m-bit data which are different for the respective pseudorandom number generating circuits 601 are supplied to the input terminal 105, the control signal L of logical "0" is supplied to the input terminal 104 and the clock signal CLK is supplied to the input terminal 103. As a result, the different m-bit data supplied through the input terminal 105 to the registers 205 (FIG. 10) of the respective pseudorandom number generating circuits 601 are input to and held in the register 205 through the selectors 206, respectively.

Then, the pseudorandom number generator 100 is put in the usual operation state by supplying the control signal L of logical "1" to the input terminal 104 and supplying the clock signal CLK to the input terminal 103. Thus, the register 205 of each pseudorandom number generating circuit 601 takes in the data which is generated by the function generator circuits 7021 and 7022 and is indicative of the new state of the register 205 through the selector 206 and holds it therein every time the clock pulse of the clock signal CLK supplied from the 103 is received as mentioned above. In this case, the selector 206 selects the data generated by either the function generator circuit 7021 or 7022 according to the logical value of the pseudorandom number $Z_{i-1}$ (state control signal) generated by converting the pseudorandom number $X_{i-1}$ from the preceding pseudorandom number generating circuit 601 by means of the function generator circuit 603 and supplies it to the register 205.

Therefore, in each pseudorandom number generating circuit 601, the register 205 always takes in and holds the new data every time when each clock pulse of the clock signal CLK is received, regardless of whether the logical value of the pseudorandom number $Z_{i-1}$ generated by the function generator circuit 603 corresponding to the preceding pseudorandom number generating circuit 601 is "0" or "1", and, therefore, the internal state of the register 205 is always changed by every clock pulse.

The function generator circuits 7021 and 7022 of each pseudorandom number generating circuit 601 generate the k-bit data dependent on the internal state of the register 205 and output them to the selector 203. The selector 203 selects one of the k-bit data from the function generator circuits 7021 and 7022 according to the logical value of the pseudorandom number $Z_{i-1}$ (state control signal) generated by the function generator circuit 603 corresponding to the preceding pseudorandom number generating circuit 601 and outputs it through the output terminal 717 as the pseudorandom number $X_i$.

The Exclusive OR circuit 602 provides an exclusive logical sum of the pseudorandom numbers $X_1$ to $X_n$ generated by all of the pseudorandom number generating circuits 601 and outputs the exclusive logical sum through the output terminal 606 as a k-bit pseudorandom number generated by the pseudorandom number generator 112.

As described, since the internal state of each pseudorandom number generating circuit 601 of the pseudorandom number generator 112 according to this embodiment is always changed regardless of the logical value of the state control signal based on the pseudorandom number generated by the preceding pseudorandom number generating circuit, there is no lock-in problem occur. Therefore, the pseudorandom number generator 112 can generate cryptographically highly safe pseudorandom numbers.

Further, since it is possible to generate cryptographically highly safe pseudorandom numbers without using a large number of pseudorandom number generating circuits 601, it is possible to reduce the size and cost of the pseudorandom generator.

Although two function generator circuits are used in each pseudorandom number generating circuit 601 of this pseudorandom number generator 112, it is possible to arrange more than two function generator circuits like the pseudorandom number generating circuit 110 (FIG. 7) of the pseudorandom number generator 100. In such case, however, since such construction requires a larger number of the function generator circuits, it is disadvantageous in views of the size and cost of the pseudorandom number generator. Therefore, the pseudorandom number generating circuit 601 which uses two function generator circuits is optimal in that both the reduction of the size of the pseudorandom number generator and the cryptographical safety of pseudorandom numbers can be achieved.

Although, in the pseudorandom number generator 112 according to this embodiment, the number of bits of the data held in the register 205 of each pseudorandom number generating circuit 601 and indicative of the internal state thereof is constantly m, it is possible to make the number of bits of the data different between the pseudorandom number generating circuits 601. Even in such case, each pseudorandom number generating circuit 601 operates basically in the same manner as mentioned above to generate the pseudorandom number and the final pseudorandom numbers are obtained by the Exclusive OR circuit 602 which calculates the exclusive logical sum of the outputs of all of the pseudorandom number generating circuits.

Further, by making the number of bits indicative of the internal state of the register of each pseudorandom number generating circuit different from others, the quality of the thus generated final pseudorandom numbers is improved, so that the cryptographical safeness thereof is further improved.

Further, it is possible to further improve the performance of the pseudorandom number generator 112 by optimizing the parameters.

That is, $S_0$, $S_1$ and the period $L_i$ of the series of the pseudorandom number generated by the i-th pseudorandom number generating circuit 601 are selected such that $L_i$ and $(L_{i-1}-W_{i-1}) \times S_0 + W_{i-1} \times S_1$ are relatively prime for an arbitrary i and $L_i$ and $L_1 \times L_2 \times \ldots \times L_{i-2}$ are relatively prime for an arbitrary i larger than 2, where $W_i$ is the number of logical "1" appearing during the period of the state control signal $Z_i$ (pseudorandom number series) generated by the i-th function generator circuit.

For the purpose of generalization, it is assumed that the number of bits of the data indicative of the internal state of each pseudorandom number generating circuit 601 is arbitrarily set.

$S_0$ and $S_1$ are indicative of function generator circuits which supply data to the selector 206 in a case where a large number of function generator circuits are arranged in each pseudorandom number generating circuit 601 similarly to the case of the pseudorandom number generating circuit 110. That is, the $S_0$-th function generator circuit and the $S_1$-th function generator circuit which is the last function generator circuit supply data to the selector.

By selecting $S_0$, $S_1$ and the period $L_i$ such that they satisfy the previously mentioned conditions, it is possible to maximize the period of the pseudorandom number series generated by the pseudorandom number generator 112.

Since this can be proved similarly to the case of the pseudorandom number generator 100, details thereof is omitted.

Incidentally, since $S_0=1$ and $S_1=2$ in the pseudorandom number generator 112, only the period $L_i$ is selected such that it satisfies the above mentioned conditions.

In the pseudorandom number generator 112, the pseudorandom numbers is obtained by providing, by the Exclusive OR circuit 602, the exclusive logical sum of the pseudorandom numbers generated by the respective pseudorandom number generating circuits 601. Alternatively, it is possible to generate the final pseudorandom numbers by arithmetically operating the pseudorandom numbers generated by the pseudorandom number generating circuits 601 in other means than the Exclusive OR circuit, although the Exclusive OR operation is optimal in views of the cryptographical safeness of pseudorandom numbers and the reduction of size of the pseudorandom number generator.

Alternatively, it is possible to provide, in lieu of the Exclusive OR circuit 602, Exclusive OR circuits for the respective pseudorandom number generating circuits 601 as in the case of the pseudorandom number generator 111 (FIG. 8).

As described hereinbefore, according to the pseudorandom number generating method of the present invention, the multi-bit state data is held in each of the pseudorandom number generating circuit. The first and second multi-bit data of one of the pseudorandom number generating circuits are generated according to the state data thus held in the one pseudorandom number generating circuit. The specific bit of the first or second data is selected according to the first pseudorandom number generated by the preceding pseudorandom number generating circuit and is output as the first pseudorandom number of the one pseudorandom number generating circuit. On the other hand, the data of the first or second data, except the specific bit thereof, is selected as the state data to be held next according to the first pseudorandom number generated by the preceding pseudorandom number generating circuit.

According to the pseudorandom number generator of the present invention, in each of the pseudorandom number generating circuit, the register takes in and holds the multi-bit state data in synchronism with each pulse of the clock signal, the first and second function generator circuits produce the first and second multi-bit data according to the state data thus held in the register, respectively. The first selector selects the specific bit of the data of either one of the first and second multi-bit data from the first and second function generator circuits according to the first pseudorandom number generated by the preceding pseudorandom number generating circuit and outputs it as the first pseudorandom number of the pseudorandom number generating circuit. On the other hand, the second selector selects the data of one of the first and second data except the specific bit according to the first pseudorandom number generated by the preceding pseudorandom number and supplies it to the register as the state data thereof.

Therefore, in the present invention, the internal states of the pseudorandom number generating circuits indicated by the state data of the respective pseudorandom number generating circuits are changed regardless of the pseudorandom numbers generated by the preceding pseudorandom number generating circuits and, therefore, the lock-in problem does not occur and hence it is possible to generate cryptographically highly safe pseudorandom numbers.

Further, since there is no lock-in problem, it is possible to generate the cryptographically highly safe pseudorandom numbers and hence to reduce the size and cost of the generator.

Further, since it is possible in the present invention to differently set the bit numbers of the state data of the respective pseudorandom number generating circuits, the variety of pseudorandom numbers is increased, the quality of pseudorandom numbers is further improved and the cryptographical safeness thereof can be further improved.

Further, since it is possible to use multi-value pseudorandom number generating circuits for generating the pseudorandom numbers as multi-bit data, the field of utility thereof can be widened.

In the pseudorandom number generating method and the pseudorandom number generator of the present invention, the first data or the first function generator circuit is the $S_0$-th data of the plurality of data or the $S_0$-th function generator circuit of the plurality of function generator circuits and the second data or the second function generator circuit is the $S_1$-th data of the plurality of data or the $S_1$-th function generator circuit of the plurality of function generator circuits, and $S_0$, $S_1$ and the period $L_i$ of the first pseudorandom number series generated by the i-th pseudorandom number generating circuit are selected such that $L_1$ and $(L_{i-1}-W_{i-1}) \times S_0 + W_{i-1} \times S_1$ are relatively prime for an arbitrary i and $L_i$ and $L_1 \times L_2 \times \ldots \times L_{i-2}$ are relatively prime for an arbitrary i larger than 2, where $W_i$ is the number of logical "1" appearing during the period of the series of the first pseudorandom number $Z_i$ generated by the i-th function generator. Therefore, in the present invention, it is possible to generate pseudorandom number series having the maximum period.

What is claimed is:

1. A pseudorandom number generating method in which a plurality of orderly pseudorandom number generating circuits are used, each pseudorandom number generating circuit is adapted to generate a first pseudorandom number on a basis of a first pseudorandom number generated by a preceding pseudorandom number generating circuit and a second pseudorandom number is generated from the first pseudorandom numbers generated by the plurality of said pseudorandom number generating circuits, said method comprising the steps, in each said pseudorandom number generating circuit, of:

holding a state data composed of a plurality of bits;

generating a first and second data each composed of a plurality of bits corresponding to the held state data;

selecting a specific bit of one of the first and second data according to the first pseudorandom number generated by said preceding pseudorandom number generating circuit and supplying the specific bit as the first pseudorandom number of said pseudorandom number generating circuit; and selecting the one of the first and second data, except the specific bit thereof, according to the first pseudorandom number generated by said preceding pseudorandom number generating circuit as the state data to be held next.

2. A pseudorandom number generating method as claimed in claim 1, further comprising the step of generating a plurality of orderly data each composed of a plurality of bits corresponding to the held state data, wherein a first data of the plurality of orderly data is generated directly from the held state data, a second and subsequent data of the plurality of the data are generated from preceding data, respectively, the first data is any of the plurality of orderly data except a last data thereof, and the second data is the last data of the plurality of orderly data.

3. A pseudorandom number generating method as claimed in claim 2, wherein the first data is an $S_0$-th data of the plurality of orderly data and the second data is an $S_1$-th data of the plurality of orderly data, where $S_0$ and $S_1$ are integers satisfying the inequality $0<S_0<S_1$, and a period $L_i$ of a series of the first pseudorandom number generated by the i-th pseudorandom number generating circuit and $(L_{i-1}-W_{i-1})\times S_0+W_{i-1}\times S_1$ are relatively prime for an arbitrary i and $L_i$ and $L_1\times L_2\times \ldots \times L_{i-2}$ are relatively prime for an arbitrary i larger than 2, where $W_i$ is the number of logical "1" appearing during the period of the series of the first pseudorandom number generated by the i-th pseudorandom number generating circuit.

4. A pseudorandom number generating method as claimed in claim 1, wherein an exclusive logical sum of the first pseudorandom numbers generated by the plurality of orderly pseudorandom number generating circuits is calculated and a resultant exclusive logical sum is the second pseudorandom number.

5. A pseudorandom number generating method as claimed in claim 1, wherein a plurality of exclusive logical sum circuits are provided for the plurality of orderly pseudorandom number generating circuits, respectively, each said exclusive logical sum circuit calculates an exclusive logical sum of the first pseudorandom number generated by corresponding one of said pseudorandom number generating circuit and a pseudorandom number calculated by exclusive logical sum circuit corresponding to said preceding pseudorandom number generating circuit and a pseudorandom number calculated by said exclusive logical sum circuit corresponding to a last one of said pseudorandom number generating circuit is the second pseudorandom number.

6. A pseudorandom number generating method as claimed in claim 1, wherein the specific bit includes 1 bit or a plurality of bits.

7. A pseudorandom number generating method as claimed in claim 1, wherein each said pseudorandom number generating circuit is a non-linear pseudorandom number generating circuit.

8. A pseudorandom number generator comprising a plurality of orderly pseudorandom number generating circuits, each said pseudorandom number generating circuit being adapted to generate a first pseudorandom number on a basis of a first pseudorandom number generated by a preceding said pseudorandom number generating circuit, a second pseudorandom number being generated from the first pseudorandom numbers generated by the plurality of said orderly pseudorandom number generating circuits, each said pseudorandom number generating circuit comprising:

a register for taking in and holding a state data composed of a plurality of bits in synchronism with clock pulses of a clock signal;

a first and second function generator circuits for producing a first and second data each composed of a plurality of bits correspondingly to the state data thus held in said register;

a first selector for selecting and supplying a specific bit of either the first or second data according to the first pseudorandom number generated by said preceding pseudorandom number generating circuit as the first pseudorandom number of said pseudorandom number generating circuit; and a second selector for selecting one of the first and second data, except the specific bit thereof, according to the first pseudorandom number generated by said preceding pseudorandom number generating circuit and supplying the selected data to said register as the state data.

9. A pseudorandom number generator as claimed in claim 8, wherein each said pseudorandom number generating circuit comprises a plurality of orderly function generator circuits each for providing data composed of a plurality of bits corresponding to the state data held by said register, a first one of said orderly function generator circuits is adapted to generate the data according directly to the state data held by said register and a second and subsequent ones of said orderly function generator circuits generate the data according to the data output from immediately preceding ones of said orderly function generator circuits, respectively, said first function generator circuit is any one of the plurality of said orderly function generator circuits except a last one of said orderly function generator circuit, and said second function generator circuit is the last one of said orderly function generator circuit.

10. A pseudorandom number generator as claimed in claim 9, wherein said first function generator circuit is an $S_0$-th function generator circuit of the plurality of said orderly function generator circuits and said second function generator circuit is an $S_1$-th function generator circuit of the plurality of said orderly function generator circuits, where $S_0$ and $S_1$ are integers satisfying the inequality $0<S_0<S_1$, and a period $L_i$ of a series of the first pseudorandom number generated by the i-th pseudorandom number generating circuit and $(L_{i-1}-W_{i-1}) \times S_0 + W_{i-1} \times S_1$ are relatively prime for an arbitrary i and $L_i$ and $L_1 \times L_2 \times \ldots \times L_{i-2}$ are relatively prime for an arbitrary i larger than 2, where i is a positive integer and $W_i$ is the number of logical "1" appearing in the period of the series of the first pseudorandom number generated by the i-th pseudorandom number generating circuit.

11. A pseudorandom number generator as claimed in claim 8, further comprising an exclusive logical sum circuit for calculating an exclusive logical sum of the first pseudorandom numbers generated by all of said pseudorandom number generating circuits and supplying the exclusive logical sum as the second pseudorandom number.

12. A pseudorandom number generator as claimed in claim 8, wherein a plurality of exclusive logical sum circuits are provided correspondingly to the plurality of said pseudorandom number generating circuits, respectively, the first pseudorandom number generated by each said pseudorandom number generating circuit being supplied to one of input terminals of one of said exclusive logical sum circuits corresponding to said pseudorandom number generating circuit, the other input terminal of said exclusive logical sum circuit being connected to an output terminal of another one of said exclusive logical sum circuit corresponding to one of said orderly pseudorandom number generating circuit preceding said pseudorandom number generating circuit, the second pseudorandom number being output from said exclusive logical sum circuit corresponding to the last one of said orderly pseudorandom number generating circuit.

13. A pseudorandom number generator as claimed in claim 8, wherein the specific bit is composed of 1 bit or a plurality of bits.

14. A pseudorandom number generator as claimed in claim 8, wherein each said pseudorandom number generating circuit comprises a non-linear pseudorandom number generating circuit.

* * * * *